US 6,571,770 B1

(12) United States Patent
Codan et al.

(10) Patent No.: US 6,571,770 B1
(45) Date of Patent: Jun. 3, 2003

(54) METHOD FOR OPERATING A DIESEL ENGINE

(75) Inventors: Ennio Codan, Hausen bei Brugg (CH); Hugo Fiedler, Neuwittenbek (DE); Ioannis Vlaskos, Fislisbach (CH)

(73) Assignee: ABB Turbo Systems AG, Baden (CH)

( * ) Notice: Subject to any disclaimer, the term of this patent is extended or adjusted under 35 U.S.C. 154(b) by 0 days.

(21) Appl. No.: 09/807,899

(22) PCT Filed: Oct. 19, 1999

(86) PCT No.: PCT/CH99/00495
§ 371 (c)(1),
(2), (4) Date: Jun. 6, 2001

(87) PCT Pub. No.: WO00/23697
PCT Pub. Date: Apr. 27, 2000

(30) Foreign Application Priority Data

Oct. 21, 1998 (DE) .......................... 198 48 418

(51) Int. Cl.⁷ .............................................. F02B 15/00
(52) U.S. Cl. ........................................ 123/432; 123/26
(58) Field of Search .................. 123/432, 26, 179.7, 123/179.8, 179.16, 179.18

(56) References Cited

U.S. PATENT DOCUMENTS

| 1,176,252 | A |   | 3/1916 | Schenker |         |
|-----------|---|---|--------|----------|---------|
| 4,162,668 | A |   | 7/1979 | Jacob et al. |     |
| 4,470,394 | A |   | 9/1984 | Tadokoro et al. |  |
| 4,554,890 | A |   | 11/1985 | Okimoto et al. | |
| 5,119,785 | A | * | 6/1992 | Saito et al. | 123/432 |
| 5,553,580 | A | * | 9/1996 | Ganoung | 123/308 |
| 5,669,341 | A | * | 9/1997 | Ushirono et al. | 123/308 |

FOREIGN PATENT DOCUMENTS

| CH | 624 182   |   | 7/1981  |
|----|-----------|---|---------|
| DE | 3737743   | * | 5/1989  |
| EP | 0 174 867 |   | 3/1986  |
| EP | 0 367 406 |   | 5/1990  |
| FR | 2358562   | * | 7/1977  |
| FR | 2527685   | * | 3/1983  |
| JP | 56-110517 A |   | 9/1981 |
| JP | 3-242425 A |   | 10/1991 |

OTHER PUBLICATIONS

Hans Rossner, DE–AN: P44581D, v 12.8.54; Abb. 2.
Dr.–Ing. Rudolf Sperger, "Technical Manual for Diesel Engines", 4$^{th}$ Edition, 1986, pp. 99–108, VBE Verlag Technik Berlin.
J.D. Ledger et al., "Performance Characteristics of a Centrifugal Compressor With Air Injection", 1973, pp. 425–434, Proc. Instn. Mech. Engrs.
Von Hans–Josef Schiffgens et al., Die Entwicklung des neuen MAN B&W Diesel–Gas–Motors 32/40 DG, 1997, pp. 584–590, MTZ Motortechnische Zeitschrift.
K. Zinner, "Supercharging of Internal Combustion Engines", 2$^{nd}$ Edition, 1980, pp. 221–228, Springer–Verlag.

* cited by examiner

Primary Examiner—John Kwon
(74) Attorney, Agent, or Firm—Burns, Doane, Swecker & Mathis, L.L.P.

(57) ABSTRACT

So that sufficient combustion air is available in all the cylinders of a diesel internal combustion engine both under part load and in transient operating states, oxygen-containing gas or additional gas or compressed air from a gas distributor is additionally supplied under pressure to the combustion space of the cylinder, even after the diesel internal combustion engine has been started, through at least one separate additional-gas inlet by means of at least one separate additional-gas valve (V1a). The supply of this additional gas can commence after closing of an air inlet valve (VE) or of an air outlet valve (VA) of the diesel internal combustion engine. The method is suitable for both 4-stroke and 2-stroke diesel internal combustion engines.

9 Claims, 3 Drawing Sheets

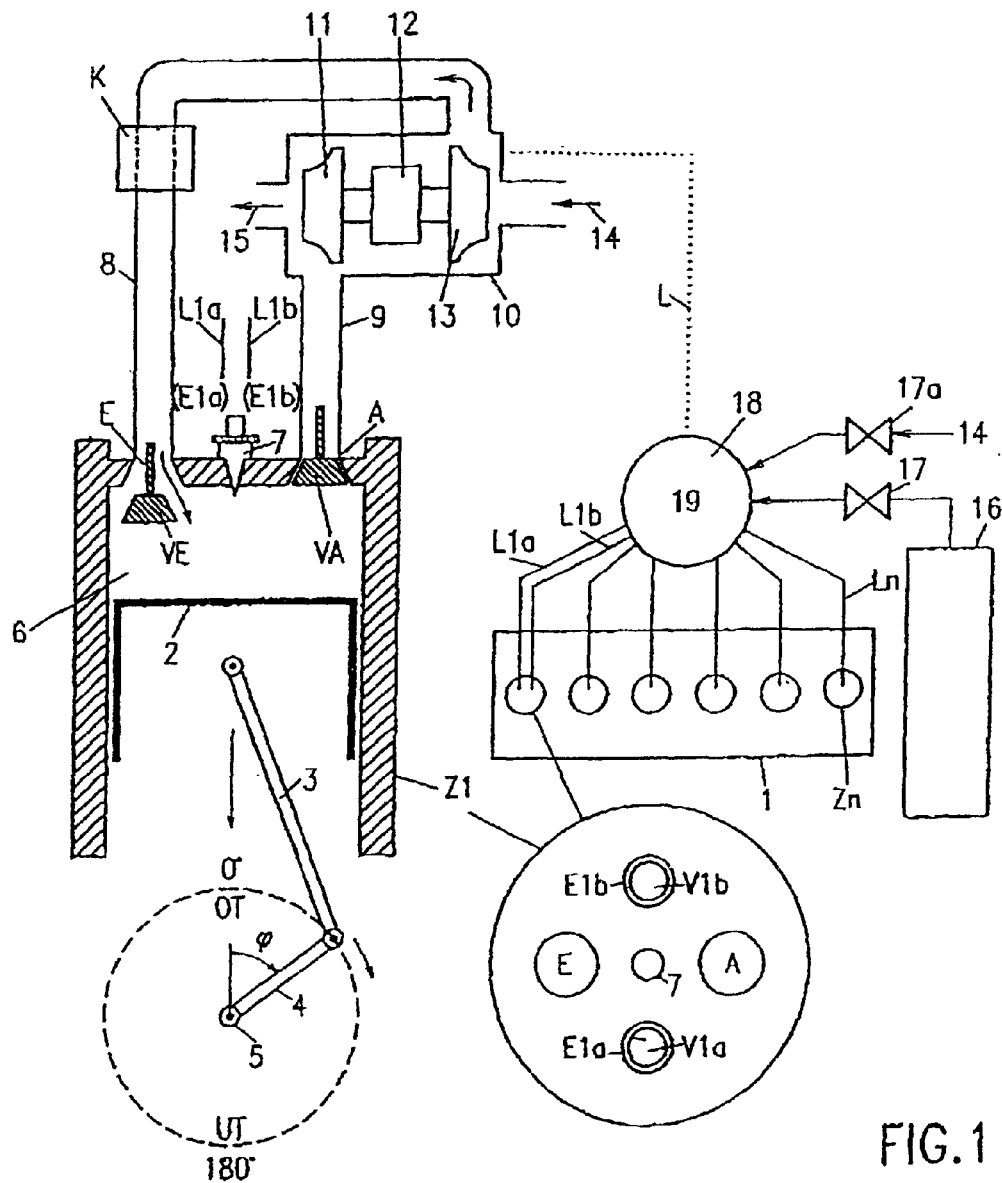
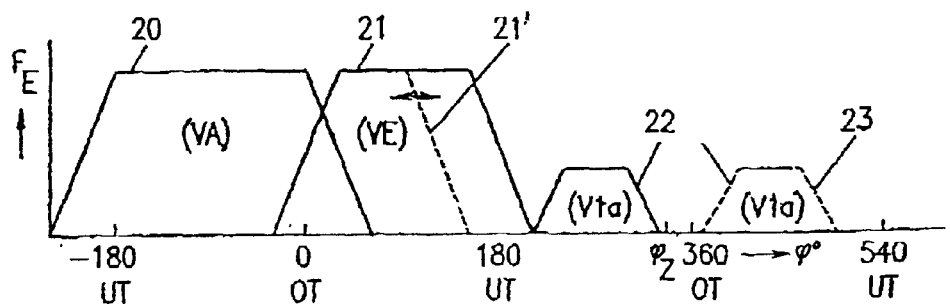
FIG.1
FIG.2

METHOD FOR OPERATING A DIESEL ENGINE

FIELD OF THE INVENTION

The invention proceeds from a method for operating a diesel internal combustion engine according to the preamble of patent claim 1.

PRIOR ART

In the preamble of patent claim 1 the invention refers to a prior art, such as is known from the publication: Proc Instn Mech Engrs 1973, Vol. 187 35/73, pp 425–434. There, additional air from a compressed-air reservoir is supplied to the compressor of a turbocharger of a diesel internal combustion engine. This additional air serves for eliminating the lack of combustion air under part load, particularly in the case of a reduced engine rotational speed and in the transient mode. One disadvantage of this is that this additional air excites blade vibrations in the compressor wheel of the compressor. When the compressor wheel is accelerated, an undesirable time delay occurs.

Several types of starting for bringing a diesel engine to the starting rotational speed necessary for the spontaneous ignition of the fuel are indicated in the Technischen Handbuch Dieselmotoren [Technical Manual for Diesel Engines], published by Prof. Dr.-Ing. Rudolf Sperber, 4$^{th}$ edition, VEB Verlag Technik Berlin 1986, pp 99–108. Larger engines employ starting by means of compressed air from a starting-air bottle with a pressure of 3 MPa via a pressure reducing valve, a central air distributor and starting valves arranged in the cylinder heads. The starting valves are spring-loaded nonreturn valves which close immediately when ignitions commence and which, in the case of reversible engines, are controlled via a camshaft. At the beginning of starting, the diesel engine operates as a compressed-air engine. The starting-air bottles may be filled up via a charging valve of an engine cylinder or by means of a compressor installed independently of the engine. A supply of additional air after the engine has been started is not disclosed.

CH 624182 A5 discloses a multicylinder diesel internal combustion engine, in which, during starting and also in the part-load mode, a higher compression and therefore better ignition conditions are achieved in some cylinder units by the remaining cylinder units temporarily being used as compressors. One disadvantage of this is that, during this mode, only some of the cylinders of the engine are available for delivering the desired power.

It is known from EP 0367406 A2 to achieve a pressure rise in the cylinder of the diesel internal combustion engine by means of a turbocharger which is driven by exhaust gases of the latter. Arranged on the shaft of the turbocharger is the rotor of an electric machine which is operated as an externally fed motor during starting or when the diesel internal combustion engine falls below a predeterminable minimum rotational speed and is otherwise operated as a generator. This solution is highly complicated.

As regards the relevant prior art, reference is made to the publication of Hans-Josef Schiffgens et al., "Die Entwicklung des neuen MAN B&W Diesel-Gas-Motors 32/40 DG" ["The Development of the new MAN B&W diesel gas engine 32/40 DG"] in: MTZ Motortechnische Zeitschrift 58 (1997) 10, pp 584–590, from which a diesel gas engine is known, in which a fuel gas is supplied under relatively low pressure to the air inlet duct of the diesel internal combustion engine. The gas valve is controlled electronically, opened hydraulically and closed by spring force.

The so-called Miller method is known inter alia from the book by K. Zinner, "Aufladung von Verbrennungsmotoren" ["Supercharging of internal combustion engines"], 2$^{nd}$ edition, Springer-Verlag Berlin Heidelberg New York 1980, pp 221–228. In this method, the air inlet valve (VE) closes before the bottom dead center (UT) of the piston of the diesel internal combustion engine, as indicated in FIG. 2 by a closing line (21') illustrated by dashes. When an engine is operating with fixed control times by the Miller method, serious air deficiency phenomena may arise in the lower load range.

DISCLOSURE OF THE INVENTION

The invention, as defined in patent claim 1, achieves the object of specifying a more cost-effective method for operating a diesel internal combustion engine of the type initially mentioned, which makes sufficient combustion air available in all the cylinders even under part load and in transient operating states.

Advantageous refinements of the invention are defined in the dependent patent claims.

One advantage of the invention is that the diesel internal combustion engine operates more effectively in all operating states, in particular that emissions and thermal loads are reduced.

According to an advantageous refinement of the invention, devices present for starting may also be used for subsequent operation and a plurality of gas inlets for starting gas and additional gas may be provided for each cylinder of the diesel internal combustion engine.

BRIEF DESCRIPTION OF THE DRAWINGS

The invention is explained below with reference to exemplary embodiments. In the drawing:

FIG. 1 shows diagrammatically a 4-stroke diesel internal combustion engine with an exhaust-gas turbocharger and a plurality of gas inlets for each cylinder for starting gas and additional gas, FIG. 2 shows an illustration of opened valve areas as a function of a crank angle.

Identical parts are designated by the same reference symbols in the figures.

WAYS OF IMPLEMENTING THE INVENTION

Figure 3:
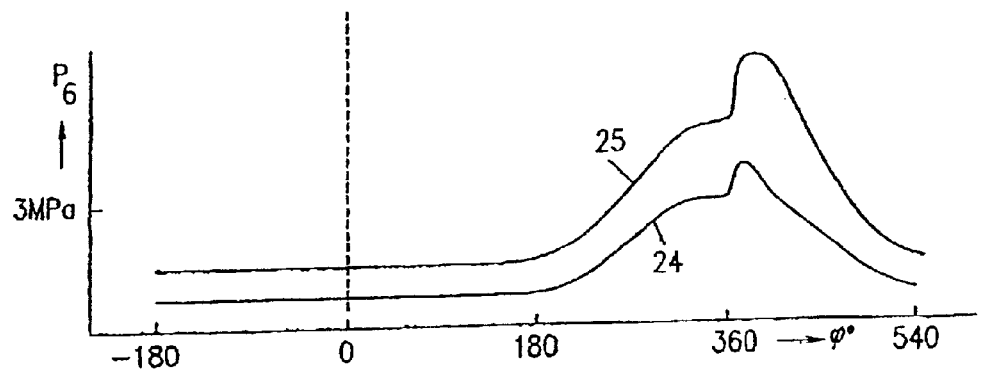
FIG. 3 shows an illustration of the cylinder pressure as a function of the crank angle for the idling and full load of the diesel internal combustion engine according to FIG. 1.

FIG. 1 shows diagrammatically an n-cylinder 4-stroke diesel internal combustion engine (1) with n identical engine cylinder units (Z1–Zn), one engine cylinder unit (Z1) being illustrated in more detail in a sectional diagram and in a top view. The engine cylinder unit (Z1) has a piston (2) which is connected in an articulated manner to an engine drive shaft (5) via a connecting rod (3) and a crank (4). A crank angle ($\phi$) begins at 0° at a top dead center (OT) of the piston (2) and increases clockwise, reaching an angle value of 180° at a bottom dead center (UT) of the piston (2). The engine cylinder unit (Z1) has, furthermore, a combustion space (6) which is connected on the cylinder-head side via a fresh-air inlet (E) to a fresh-air intake line (8) and via an exhaust gas outlet (A) to an exhaust-gas line (9). The fresh-air inlet (E) can be closed by means of a controllable air inlet valve (VE) and the exhaust-gas outlet (A) by means of a controllable air outlet valve (VA). A fuel injection nozzle (7), likewise arranged on the cylinder-head side, serves for injecting diesel fuel shortly before an ignition point ($\phi_z$) is reached, cf. FIG. 2, or before an ignition temperature in the combustion space (6) is reached.

An exhaust gas (15) flowing out of the combustion space (6) through the exhaust-gas outlet (A) after a working stroke of the 4-stroke diesel internal combustion engine (1) is utilized by the exhaust-gas line (9) for driving a turbine (11) of an exhaust-gas turbocharger (10). Fastened on a shaft of the exhaust-gas turbocharger (10) is a compressor (13) which compresses fresh air (14) and delivers it to the fresh-air inlet (E) via an air cooler (K) in the fresh-air intake line (8). A rotor of an electric machine (12) may also be fastened on this shaft and is operated as a motor during the starting of the 4-stroke diesel internal combustion engine (1) and as a generator thereafter.

The engine cylinder unit (Z1) has, furthermore, on the cylinder-head side two separate gas inlets or additional-gas inlets or starting-gas inlets (E1a) and (E1b) for compressed air or an additional gas or a starting gas (19), which in each case have a smaller orifice cross section than the fresh-air inlet (E). These starting-gas inlets (E1a, E1b) are capable of being closed by means of controllable nonreturn valves or additional-gas valves or starting valves (V1a, V1b). The starting gas (19) is supplied from a compressed-air bottle or a gas reservoir (16) with a gas pressure of normally 3 MPa, via a pressure reducing valve or compressed-gas regulating valve (17), to a supply-air distributor or starting-gas distributor (18), from where it arrives via compressed-air lines or compressed-gas lines (L1a, L1b, Ln) at the starting-gas inlets (E1a, E1b) of the engine cylinder units (Z1–Zn). One or more starting-gas inlets (E1a, E1b) and starting valves (V1a, V1b) may be provided for each engine cylinder unit (Z1–Zn).

FIG. 2 shows the time sequence of the openings of the valves (VA), (VE) and (V1a), the crank angle ($\phi$) in degrees being plotted on the abscissa and a fresh-air inlet opening area (FE) in arbitrary units being plotted on the ordinate. An area curve (20) for the air outlet valve (VA) indicates that the latter begins to open before the bottom dead center (UT) and is opened completely between bottom dead center (UT) and top dead center (OT). Shortly thereafter it closes and thus terminates the outlet phase. An area curve (21) for the air inlet valve (VE) indicates that the latter begins to open shortly before the top dead center (OT), until it remains fully open shortly before the subsequent bottom dead center (UT) and is closed shortly thereafter. This terminates the inlet phase of the air inlet valve (VE). After the closing of this air inlet valve (VE), the starting valves (V1a, V1b) begin to open according to an area curve (22), only the starting valve (V1a) being depicted for the sake of clarity. These starting valves (V1a, V1b) close shortly before the next top dead center (OT) is reached and before the commencement of ignition at an ignition point ($\phi_z$), with the result that the compression phase is terminated. Preferably, these starting or additional-gas valves (V1a, V1b) close before the commencement of the injection of diesel fuel. During the opening of these starting valves (V1a, V1b), compressed air or starting or additional gas (19) passes without delay into the combustion space (6) of the engine cylinder unit (Z1) and eliminates the undesirable lack of combustion air there.

An area curve (22') illustrated by dots indicates that the opening of the starting valves (V1a, V1b) can begin even after the closing of the air outlet valve (VA), the closing of the latter being capable of taking place variably. An area curve (23), illustrated by dashes, of the starting valves (V1a, V1b) shows the opening of the starting valves (V1a, V1b) during the starting of the 4-stroke diesel internal combustion engine (1).

FIG. 3 shows a combustion-space pressure ($p_6$) in MPa in the combustion space (6) of the 4-stroke diesel internal combustion engine (1) as a function of the crank angle ($\phi$) for the idling mode in a pressure curve (24) and for the full-load mode in a pressure curve (25). It can be seen that a combustion-space pressure ($p_6$) of 3 MPa is reached sooner under full load than during idling. The starting valves (V1a, V1b) must be closed at the latest when the pressure of the additional gas (19) is reached in the combustion space (6).

Figure 4:
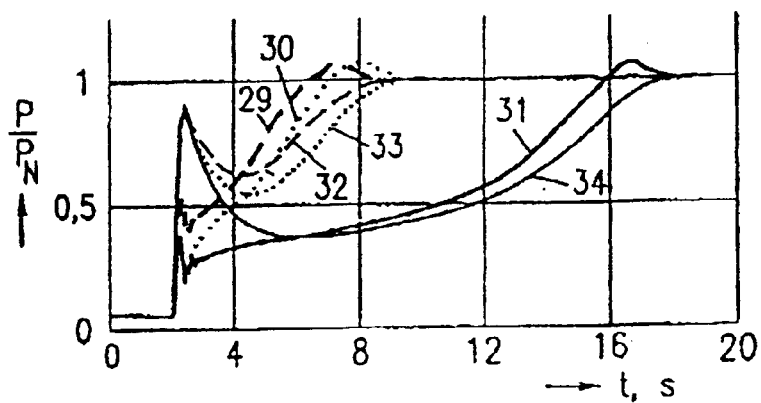
FIG. 4 shows graphs of a rating-related power of the diesel internal combustion engine according to FIG. 1 as a function of time.

FIG. 4 shows, computer-simulated, the ratio of a power (P) to a rated power ($P_N$) as a function of time (t) for the 4-stroke diesel internal combustion engine (1) in rating-related engine power curves (29–31) and in rating-related consumer power curves (32–34), the curves (31) and (34) illustrated by unbroken lines being obtained without the use of additional gas (19), and the curves (29) and (32) illustrated by dashes being obtained with additional gas (19) being used according to the invention. The curves (30) and (33) illustrated by dots were obtained during the conventional supply of additional gas (19) into the compressor (13), as indicated in FIG. 1 by the compressed-gas line (L) illustrated by dots. It can be seen from this that the rated power ($P_N$) is reached the most quickly by means of the method according to the invention.

Figure 5:
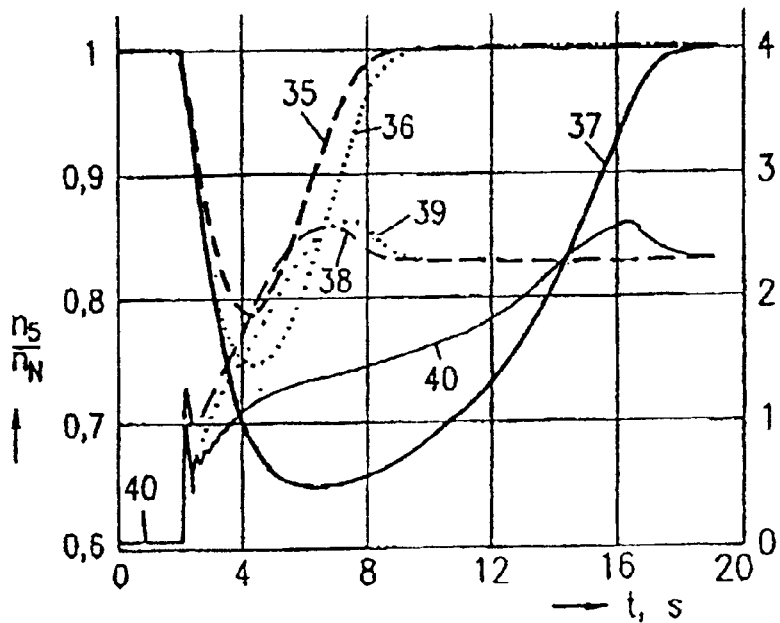
FIG. 5 shows graphs of a rating-related rotational speed and of an actual mean pressure in the cylinder of the diesel internal combustion engine according to FIG. 1 as a function of time.

FIG. 5 shows, computer-simulated, the ratio of a rotational speed of the engine drive shaft (5) or of an engine rotational speed ($n_s$) to a rated rotational speed ($n_N$) as a function of time (t) for the 4-stroke diesel internal combustion engine (1) in rating-related rotational speed curves (35–37) and of an actual mean pressure ($P_{me}$) in the combustion space (6) in MPa in curves of the actual mean pressure or in mean-pressure curves (38–40), the curves (37) and (40) illustrated by unbroken lines being obtained without the use of additional gas (19), and the curves (35) and (38) illustrated by dashes being obtained with additional gas (19) being used according to the invention. The curves (36) and (39) illustrated by dots were obtained during the conventional supply of additional gas (19) into the compressor (13). It can be seen from this that the rated rotational speed ($n_N$) is reached the most quickly by means of the method according to the invention.

Figure 6:
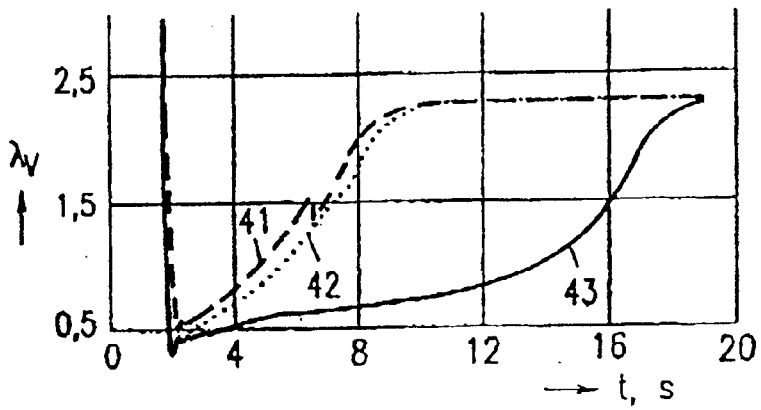
FIG. 6 shows graphs of the combustion ratio in the case of a 4-stroke diesel internal combustion engine according to FIG. 1 as a function of time.

FIG. 6 shows, computer-simulated, a combustion ratio ($\lambda_v$) as a function of time (t) for the 4-stroke diesel internal combustion engine (1) in curves (41–43), the curve (43) illustrated by unbroken lines being obtained without the use of additional gas (19), and the curve (41) illustrated by dashes being obtained with additional gas (19) being used according to the invention. The curve (42) illustrated by dots was obtained during the conventional supply of additional gas (19) into the compressor (13) via the additional line (L). The following relation applies to the combustion ratio ($\lambda_v$):

$$\lambda_v = m_{LZ}/(m_B \cdot L_{min}),$$

$m_{LZ}$ being the air mass supplied to the combustion space (6), $m_B$ the fuel mass supplied and $L_{min}$ a stoichiometric air/fuel ratio, that is to say the minimum quantity of air which is necessary for the combustion of the fuel. It can be seen from this that the stationary final value of the combustion ratio ($\lambda_v$) is reached the most quickly by means of the method according to the invention. t=2 s means, in FIGS. 4–6, the load cut-in point. When the air quantity in the engine cylinders (Z1–Zn) is increased by 10% at the point t=2 s by the supply of additional air (19), an increase in the combustion ratio ($\lambda_v$) of 150% is consequently achieved at the point t=6 s. The additional air (19) allows the combustion of additional diesel fuel. This results in a more rapid acceleration of the exhaust-gas turbocharger (10).

Figure 7:
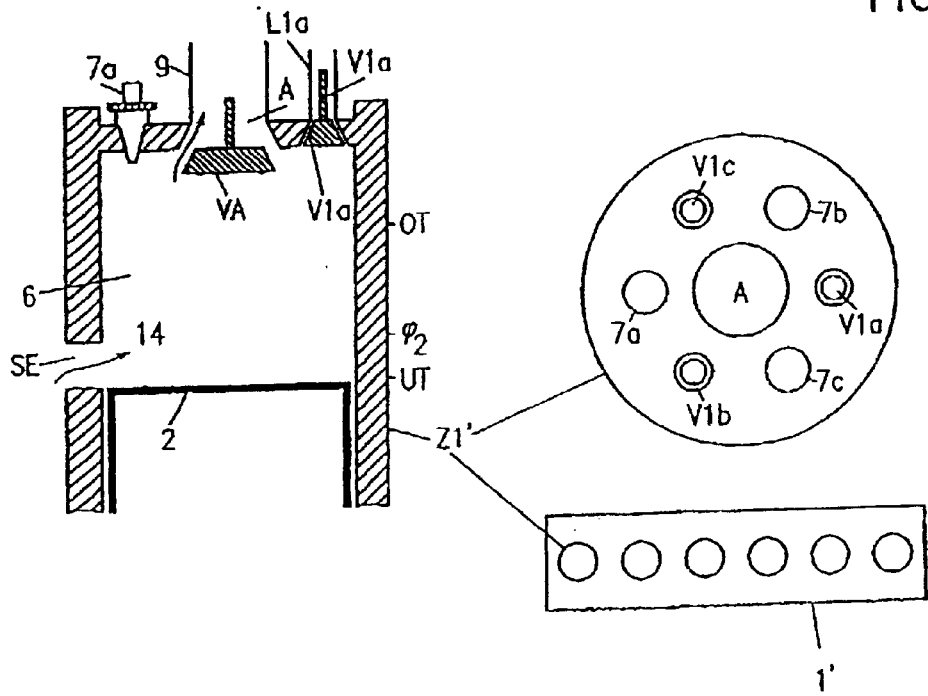
FIG. 7 shows diagrammatically a 2-stroke diesel internal combustion engine with a plurality of gas inlets for each cylinder for starting gas and additional gas.

FIG. 7 shows diagrammatically a 2-stroke diesel internal combustion engine (1'), for which the method according to the invention may likewise be used. Fuel injection nozzles (7a, 7b, 7c) and starting valves (V1a, V1b, V1c) are arranged in a circle around a central exhaust-gas outlet (A) in the cylinder head of an engine cylinder unit (Z1'). (SE) designates one of the plurality of lateral fresh-air inlets or fresh-air inlet slits.

Figure 8:
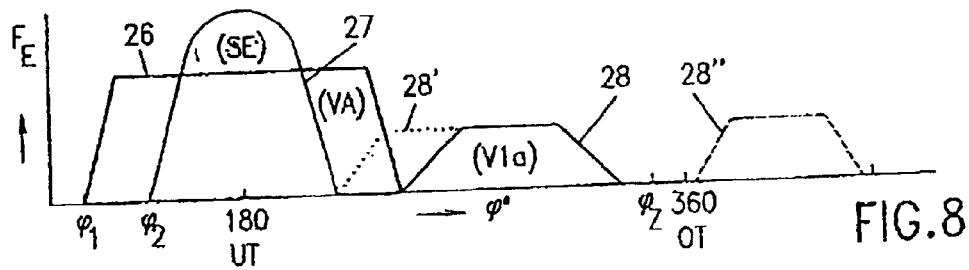
FIG. 8 shows an illustration of opened valve areas of the 2-stroke diesel internal combustion engine according to FIG. 7 as a function of the crank angle.

FIG. 8 shows a time sequence, corresponding to the illustration in FIG. 2 of the openings of the valves (VA) and (V1a) and also of the fresh-air inlet slits (SE) of the 2-stroke diesel internal combustion engine (1'), the crank angle ($\phi$) in degrees being plotted on the abscissa and the fresh-air inlet opening area ($F_E$) in arbitrary units being plotted on the ordinate. An area curve (26) for the air outlet valve (VA) indicates that the latter begins to open before the bottom dead center (UT) in a first crank angle position ($\phi_1$) and closes at the same angular interval after this bottom dead center (UT). An area curve (27) for the fresh-air inlet slits (SE) indicates that these begin to open before the bottom dead center (UT) in a second crank angle position ($\phi_2$) after the crank angle position ($\phi_1$) and close at the same angular interval after this bottom dead center (UT). After the closing of these fresh-air inlet slits (SE), the starting valves (V1a, V1b, V1c) begin to open according to an area curve (28'), only the starting valve (V1a) being depicted for the sake of clarity. These starting valves (V1a, V1b, V1c) close shortly before the next top dead center (OT) is reached and before the commencement of ignition at the ignition point ($\phi_z$), with the result that the compression phase is terminated. Preferably, the opening of the starting valves (V1a, V1b, V1c) begins after the closing of the air outlet valve (VA), as illustrated by the area curve (28). An area curve (28") illustrated by dashes shows the opening of the starting or additional-gas valves (V1a, V1b, V1c) during the starting of the 2-stroke diesel internal combustion engine (1').

It is important to utilize the starting gas (19) and the starting valves (V1a, V1b, V1c) not only for starting the diesel internal combustion engines (1, 1'), but, with changed control times, also for supplying additional air after starting, during normal operation.

The invention can also be used in diesel internal combustion engines (1, 1') without a starting-gas start.

Preferably, the additional gas (19) is supplied to the combustion space (6) of the diesel internal combustion engine (1, 1') under a pressure in the range of 0.6 MPa–3 MPa during transient load actions.

When the diesel internal combustion engine (1, 1') is under stationary part load, the additional gas (19) is supplied to the combustion space (6) under a pressure in the range of 100 kPa–800 kPa.

When a diesel internal combustion engine (1, 1') is operating according to the so-called Miller method in a lower load range of up to 50% of the rated load, this additional gas (19) can be sucked in, without excess pressure, by the cylinders (Z1, Z1', Zn) of the diesel internal combustion engine (1, 1'). In this case, the compressed-gas regulating valve (17) according to FIG. 1 is closed and a fresh-air valve (17a) is opened for the inlet of fresh air (14). When the diesel internal combustion engines (1, 1') are operated without excess pressure according to the Miller method only, the valves (17) and (17a) and also the gas reservoir (16) are dispensed with. The additional gas (19) may be sucked in from the surroundings (14) of the diesel internal combustion engine (1, 1') or from the outlet of the compressor (13) of the exhaust-gas turbocharger (10) by the cylinders (Z1, Z1', Zn) of the diesel internal combustion engine (1,1').

| | List of designations |
|---|---|
| 1 | 4-stroke diesel internal combustion engine |
| 1' | 2-stroke diesel internal combustion engine |
| 2 | Piston |
| 3 | Connecting rod |
| 4 | Crank |
| 5 | Engine drive shaft |
| 6 | Combustion space |
| 7, 7a, 7b, 7c | Fuel injection nozzles |
| 8 | Fresh-air intake line |
| 9 | Exhaust-gas line |
| 10 | Exhaust-gas turbocharger |
| 11 | Turbine of 10 |
| 12 | Electric machine of 10 |
| 13 | Compressor of 10 |
| 14 | Fresh air |
| 15 | Exhaust gas |
| 16 | Gas reservoir, compressed-air bottle |
| 17 | Compressed-gas regulating valve, pressure reducing valve |
| 17a | Fresh-air valve |
| 18 | Starting-gas distributor, supply-air distributor, gas distributor |
| 19 | Starting gas, additional gas, compressed air, oxygen-containing gas |
| 20–23 | Area curves of open valves of 1 |
| 21' | Closing line of 21 according to the Miller method |
| 24, 25 | Pressure curves for idling and full load |
| 26–28 | Area curves of opened values of a 2-stroke diesel internal combustion engine |
| 29–34 | Time-dependent curves of rating-related engine and consumer powers of 1 |
| 35–37 | Rotational speed curves of rating-related rotational speeds of 1 |
| 38–40 | Time-dependent mean-pressure curves of the actual mean pressure in the combustion space of a cylinder of 1. |
| 41–43 | Curves of the combustion ratio $\lambda_v$ as a function of time |
| A | Exhaust-gas outlet |
| E | Fresh-air inlet, gas inlet |
| E1a, E1b | Gas inlets for starting gas/additional gas, starting-gas inlets |
| $F_E$ | Fresh-air inlet opening area |
| K | Air cooler |
| L, L1a, L1b, Ln | Compressed-gas lines, additional-gas lines |
| $n_5$ | Rotational speed of 5, engine rotational speed |
| $n_N$ | Rated rotational speed |
| OT | Top dead center |
| P | Power of 1 |
| $P_N$ | Rated power of 1 |
| $P_6$ | Pressure in 6 |

-continued

List of designations

| | |
|---|---|
| SE | Fresh-air inlet slits |
| t | time |
| UT | Bottom dead center |
| VA | Air outlet valve |
| VE | Air inlet valve |
| V1a, V1b, V1c | Starting valves, additional-gas valves, nonreturn valves |
| Z1–Zn | Engine cylinder units of 1 |
| Z1' | Engine cylinder unit of 1' |
| $\phi$ | Crank angle |
| $\phi_1, \phi_2$ | Crank angle positions |
| $\phi_z$ | Ignition point, ignition-angle position |
| $\lambda_v$ | Combustion ratio in 1 |

What is claimed is:

1. A method for operating a diesel internal combustion engine,
wherein fresh air for the combustion of a fuel/air mixture is compressed by an exhaust-gas turbocharger and is supplied into a combustion space of its cylinders through at least one fresh-air inlet,
wherein, during the starting of the diesel internal combustion engine, additional gas is capable of being supplied as starting gas to the combustion space through at least one separate additional-gas inlet by means of at least one separate additional-gas valve,
wherein, when the diesel internal combustion engine is operating under part load or under transient load, oxygen-containing additional gas is additionally supplied to the combustion space before ignition of the fuel/air mixture through at least one of these separate additional-gas inlets, and
wherein, when the diesel internal combustion engine is operating under part load or under transient load, the additional oxygen-containing additional gas is supplied to the combustion space after the closing of the fresh-air inlet.

2. The method as claimed in claim 1, wherein, when the diesel internal combustion engine is operated under part load or transient load, the oxygen-containing additional gas is supplied to the combustion space after a closing of an air outlet valve.

3. The method as claimed in claim 1, wherein, when the diesel internal combustion engine is operating under part load or under transient load, the oxygen-containing additional gas is supplied to this combustion space before a diesel fuel is injected into this combustion space.

4. The method as claimed in claim 1, wherein, when the diesel internal combustion engine is operating under part load or transient load, this additional gas is supplied to this combustion space at the latest up to an ignition point.

5. The method as claimed in claim 1, wherein this additional gas is supplied to this combustion space simultaneously through a plurality of additional-gas inlets.

6. The method as claimed in claim 1, wherein this additional gas is supplied to this combustion space under a pressure in the range of 1.5 MPa–3 MPa during transient load actions on the diesel internal combustion engine.

7. The method as claimed in claim 1, wherein this additional gas is supplied to this combustion space under a pressure in the range of 100 kPa–800 kPa when the diesel internal combustion engine is under a stationary part load.

8. The method as claimed in claim 1, wherein this additional gas is sucked in from the surroundings of the diesel internal combustion engine or from the outlet of a compressor of an exhaust-gas turbocharger by the cylinders of the diesel internal combustion engine.

9. The method as claimed in claim 1, wherein this additional gas is sucked in from the surroundings of the diesel internal combustion engine or from the outlet of a compressor of an exhaust-gas turbocharger by the cylinders of the diesel internal combustion engine.

* * * * *